(12) United States Patent
Gutta et al.

(10) Patent No.: US 6,424,272 B1
(45) Date of Patent: *Jul. 23, 2002

(54) VEHICULAR BLIND SPOT VISION SYSTEM

(75) Inventors: Srinivas Gutta, Buchanan; Miroslav Trajkovic, Ossining; Antonio Colmenarez, Peekskill, all of NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,434

(22) Filed: Mar. 30, 2001

(51) Int. Cl.[7] ................................................ G08G 1/017
(52) U.S. Cl. ........................ 340/937; 340/436; 340/435; 340/936; 701/301
(58) Field of Search ................................ 340/937, 936, 340/435, 436; 701/301

(56) References Cited

U.S. PATENT DOCUMENTS 4,988,994 A * 1/1991 Loeven ........................ 340/937
5,680,123 A * 10/1997 Lee ............................ 340/937
6,115,651 A * 9/2000 Cruz ........................... 340/435
6,172,601 B1 * 1/2001 Wada et al. ................. 340/435

FOREIGN PATENT DOCUMENTS

| WO | WO 91/00674 | 1/1991 |
| WO | WO 96/38319 | 12/1996 |
| WO | WO 00/38949 | 7/2000 |
| WO | WO 00/54008 | 9/2000 |

* cited by examiner

Primary Examiner—Daniel J. Wu
(74) Attorney, Agent, or Firm—John Vodopia

(57) ABSTRACT

A blind spot vision system for a vehicle includes a camera having a field of view. The camera is positioned on the vehicle such that the field of view corresponds with at least a portion of an area proximate the vehicle which is not visible to a driver while the driver looks in mirrors that are positioned on the vehicle. The system also includes an object identifier electrically coupled to the camera, a relative speed identifier which determines the relative speed of an object which is in the field of view of the camera, and a display electrically coupled to the camera which displays an image generated by the camera and provides an indication of the type of object identified by the object identifier which is in the field of view of the camera and displayed on the display.

14 Claims, 2 Drawing Sheets

VEHICULAR BLIND SPOT VISION SYSTEM

FIELD OF THE INVENTION

This invention relates to vision systems for vehicles, and more particularly relates to a vehicular blind spot vision system which provides a driver of a vehicle with information concerning objects located in the driver's blind spot.

BACKGROUND INFORMATION

A major cause of driving accidents is a driver's inability to recognize that another vehicle is proximate the driver's vehicle and that it is therefore unsafe to change lanes. The most difficult area for a driver to monitor is the driver's blind spot. Blind spots are attributable to, among other things, voids in coverage provided by mirrors that are positioned on the vehicle and by visual interference caused by objects (e.g. a part of the vehicle or an object being transported thereon or therein) which are located in the driver's line of vision.

Blind spots are traditionally monitored by the driver turning his head from the forward direction of travel of the vehicle to directly view the area in question. This is typically performed to determine whether another vehicle is proximate the driver's vehicle. In order for the driver to determine whether it is safe to change lanes, the driver must determine not only if a vehicle is present in the blind spot, but the size of the vehicle and its relative speed. This can only be accomplished if the driver observes the blind spot, and the vehicle that is in the blind spot, for a period of time (typically a few seconds). By turning his head from the forward direction of travel and observing the blind spot, the driver is reducing the chance of getting into an accident with a vehicle that is next to the driver's vehicle when changing lanes. However, since the driver is not continually observing the roadway that is in front of the vehicle, the likelihood of the driver's vehicle being involved in a frontal collision increases.

It would be beneficial to have a vehicular vision system which enables a driver to easily view his blind spot, identify the type of vehicle in the blind spot, and identify the relative speed of travel of the vehicle in the blind spot without requiring the driver to turn his head from the forward direction of travel.

OBJECTS OF THE SUMMARY OF THE INVENTION

It is therefore an object of the present invention to provide a system which enables a driver to view his blind spot without requiring the driver turn his head from the forward direction of travel.

It is another object of the present invention to provide a system which identifies a type of vehicle in the driver's blind spot without requiring the driver turn his head from the forward direction of travel.

It is yet another object of the present invention to provide a system which determines a relative speed of travel of a vehicle in a driver's blind spot without requiring the driver to turn his head from the forward direction of travel.

It is a further object of the present invention to provide a blind spot vision system for a vehicle which overcomes inherent disadvantages of known vehicle vision systems.

In accordance with one form of the present invention, a blind spot vision system for a vehicle includes at least one camera having a field of view and being positioned on the vehicle such that the field of view corresponds with at least a portion of an area proximate the vehicle which is not visible to a driver when looking in mirrors that are positioned on the vehicle, an object identifier electrically coupled to the camera and identifying an object which is in the field of view of the camera, and a display electrically coupled to the camera which displays an image generated by the camera and provides an indication of the type of object identified by the object identifier which is in the field of view of the camera.

In accordance with another form of the present invention, a blind spot vision system for a vehicle includes at least one camera having a field of view and being positioned on the vehicle such that the field of view corresponds with at least a portion of an area proximate the vehicle which is not visible to a driver when looking in mirrors that are positioned on the vehicle, a relative speed identifier which determines a relative speed of an object which is in the field of view of the camera, and a display electrically coupled to the camera and the relative speed identifier which displays an image generated by the camera and provides an indication of the relative speed of the object which is in the field of view of the camera and displayed on the display.

A preferred form of the vehicular blind spot vision system, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENT

Figure 1:
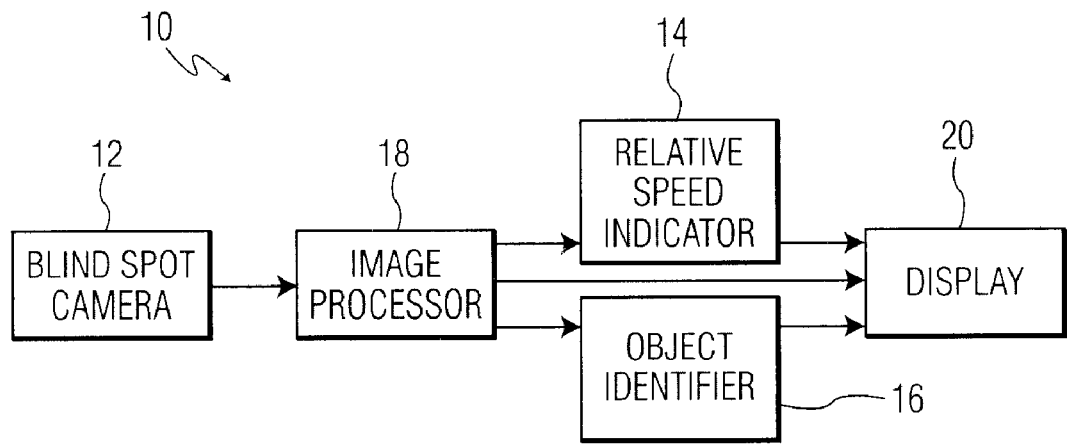
FIG. 1 is a block diagram of the vehicular blind spot vision system according to the present invention.

Referring now to the drawings, and initially to FIG. 1, the vehicular blind spot vision 10 system includes a blind spot camera 12, a relative speed indicator 14, and an object identifier 16. An output port of the blind spot camera is coupled to an input port of an image processor 18. The image processor 18 receives data image signals from the blind spot camera and synthesizes an image which is provided to the relative speed indicator and the object identifier. The image processor preferably has first and second output ports which provide signals to each respective input port of the relative speed indicator and the object identifier. The output of each of the relative speed indicator and the object identifier are provided to a display 20. The display 20 also receives the image signal from the blind spot camera via the image processor.

Alternative to the above, an output of the blind spot camera 12 can be directly coupled to the display 20. In addition the relative speed identifier 14 and object identifier 16 need not receive input signals from the image processor, but can receive input information required to perform their desired functions from appropriate sensors (described below) located on the vehicle.

Figure 2:
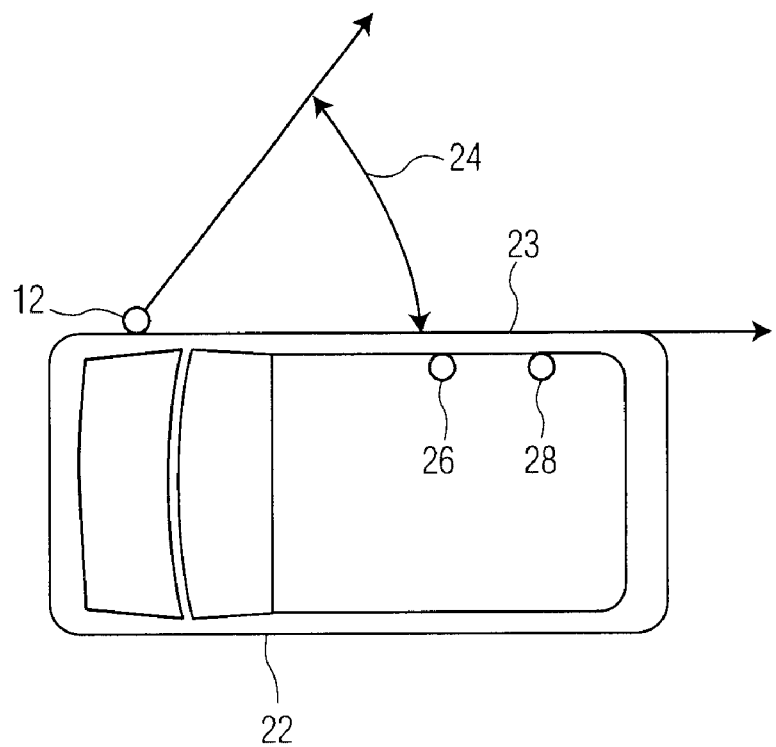
FIG. 2 is a top plan view of a vehicle having a blind spot vision system according to the present invention.

Referring now to FIG. 2, the vehicular blind spot vision system is employed in a vehicle 22, such as an automobile, truck, sport utility, van, bus, and motorcycle for providing a driver of the vehicle with a view of the blind spot and information regarding objects located in the blind spot. The camera 12 is preferably disposed on a portion of the vehicle (e.g., a passenger side front portion of the vehicle) such that a rearward and sideward field of view is obtained which includes the driver's blind spot. In the preferred embodiment, the field of view of the blind spot camera covers an area bounded by the side 23 of the vehicle and extends outwardly at an angle 24 defined by the horizontal field of view of the camera. The image captured by the blind spot camera 12 is provided to the image processor 18 which processes the image signals and provides the processed image signals to the display 20, relative speed identifier 14 and object identifier 16. A suitable camera for use as the blind spot camera is disclosed in WO96/38319, the entire disclosure of which is incorporated herein by reference.

The vehicular blind spot vision system includes an object identifier 16 which analyzes the images present in the field of view of the blind spot camera 12 and identifies the type of object in the field of view by extraction and classification. The extraction of objects from the field of view is well known in the art and can be accomplished in accordance with a number of well-known methods, such as the methods described in Segmentation and Tracking Using Color Mixture Models, by Yogesh Raja, Stephen J. McKenna and Shaogang Gong, Proceedings of the $3^{rd}$ Asian Conference on Computer Vision, Vol. 2, pp. 607–614, Hong Kong, China, 1998; and Statistical Foreground Modelling for Object Localization, by Josephine Sullivan, Andrew Blake and Jens Rittcher, Proceedings of the $6^{th}$ European Conference on Computer Vision, Vol. 2, pp. 307–323, Dublin, Ireland, 2000, the entire disclosures of each of which are incorporated herein by reference.

Once the objects have been extracted, then classification of the object is performed. Classification is performed in accordance with any number of well-known methods. In the preferred embodiment classification refers to providing descriptive information concerning the object extracted from the image generated by the blind spot camera. The identification could be as simple as saying that the object is a car, minivan or truck. A known method for classifying objects is described in U.S. application Ser. No. 09/794,443 to Gutta et al entitled "Classification of Objects Through Model Ensembles" filed Feb. 27, 2001; and Pedestrian Tracking from a Moving Vehicle, by Vasanth Philomin, Ramani Duraiswami and Larry Davis, Proceedings of the IEEE Intelligent Vehicles Symposium, Vol. 1, pp. 350–355, Dearborn, USA, 2000, the entire disclosures of each of which is incorporated herein by reference. While the later above-identified reference discusses tracking and classification of pedestrians, the same system can be extended by a person of ordinary skill in the art to the classification of vehicles.

As mentioned previously, the present invention includes a relative speed identifier 14 to compute the rate at which the vehicle which is in the driver's blind spot is traveling relative to the speed of the driver's vehicle. Many known systems are capable of providing the relative speed of the object in the driver's blind spot such as a radar or sonar type system wherein a signal is transmitted to the object and returned to the transmitter for determination of the relative speed, and stereo cameras or a single camera wherein the images acquired from the cameras are compared to determine the speed of the vehicle. In the preferred embodiment, the relative speed identifier analyzes the images generated by the blind spot camera and processed by the image processor. Based upon these images, the relative speed determiner determines the speed of the object in the field of view relative to the speed of the driver's vehicle so that the driver will be made aware of whether the vehicle that is in the blind spot is passing or falling behind the driver's vehicle.

Once the image of the driver's blind spot is obtained by the blind spot camera, an object in the field of view of the camera is identified by the object identifier 16 as explained above. Thereafter, the relative speed of the object in the field of view of the camera is identified, and this information is provided to the image processor which processes the information and provides the information to the display 20 for viewing by the driver. The screen of the display can have many forms, and a preferred form is shown in FIG. 3.

Figure 3:
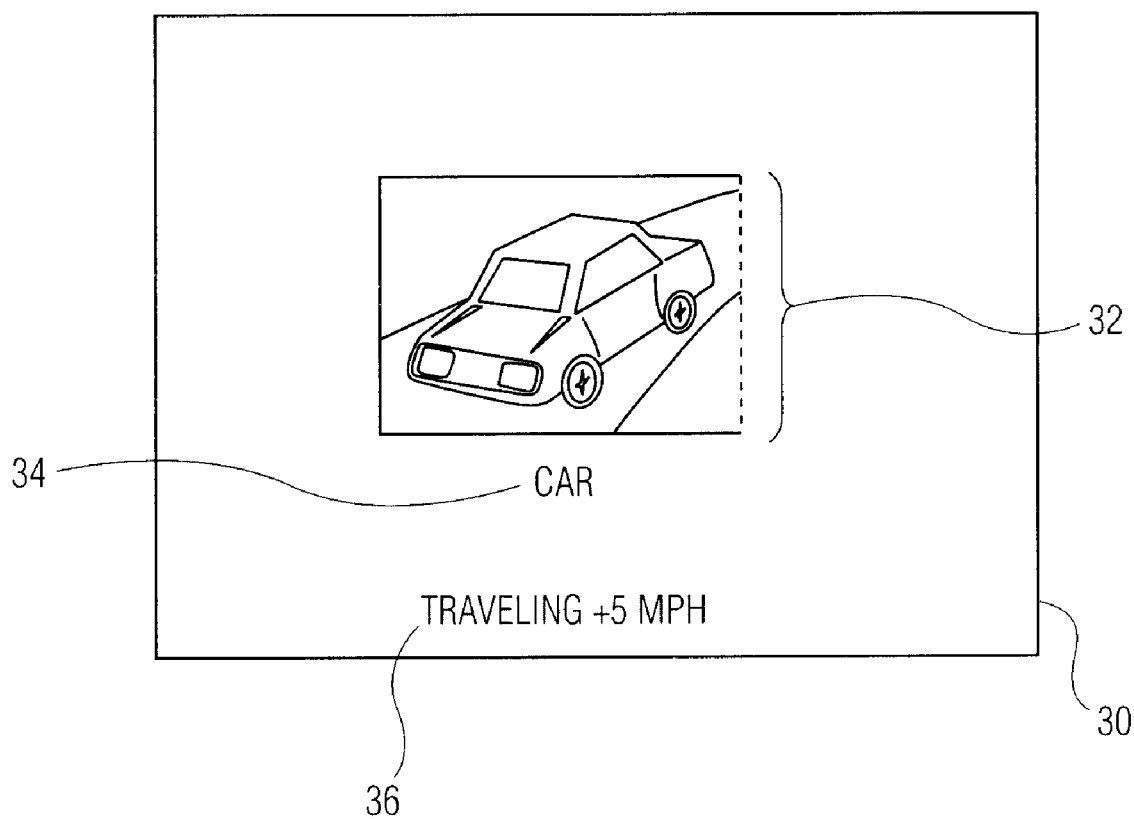
FIG. 3 is a front elevation of a display according to the present invention.

Referring now to FIG. 3, the image display device 20 displays a composite image which includes the field of view 32 of the blind spot camera, a notation 34 of the type of object identified by the object identifier, and an indication of the relative speed 36 of the object in the field of view of the camera as compared to the speed of the driver's vehicle.

The display is of a size to be as natural as possible to the driver. This is a function of the size of the displayed image and the distance between the display the driver. Preferably, the displayed image simulates an image reflected by a rear or side view mirror. The display is preferably positioned within the driver's physiological forward field of view, without significantly obstructing the forward field of view of the driver.

The display may be a direct view flat panel display, such as a back-lit or reflective liquid crystal display, a plasma display, a field emission display, a cathode ray tube electroluminescent device, light-emitting diode or deformable mirror display. A display may be mounted/attached to the dashboard, facia or header, or to the windshield at a position conventionally occupied by an interior rearview mirror. The image generated by the image processor could also be displayed using other display techniques such as to provide a projected or virtual image. Alternatively, a virtual image may be displayed on an opaque display adjacent the forward field of view, or a view-through heads-up display in which the image is superimposed on the forward field of view.

While the present invention is discussed above in connection with a single camera, it is foreseen that additional cameras may be placed on the driver's side of the vehicle and a rear end portion of the vehicle to provide the driver with a panoramic rearward view from the vehicle. Alternatively, in order to achieve a panoramic view, a wide field of view camera (e.g. fish-eye) or omni camera (e.g., camera with a parabolic mirror attached in front of the camera enabling capture of the entire scene) could be employed. In this alternative embodiment, the object identifier and relative speed identifier would function to identify each object and its relative speed. This information would be included on the display.

Although illustrative embodiments of the present invention have been described above in connection with the drawings, it is foreseen that the invention is not to be limited to these precise embodiments and that various modifications can be made by persons skilled in the art without departing from the scope and spirit of the invention. For example, it is foreseen that the relative distance of each object identified by the object identifier could be determined and displayed on the display for the driver's consideration.

What is claimed is:

1. A blind spot vision system for a vehicle, comprising:
   at least one camera having a field of view, the at least one camera being positioned on the vehicle such that the field of view corresponds with at least a portion of an area proximate the vehicle which is non-visible to a driver while the driver looks in mirrors that are positioned on the vehicle;

an object identifier electrically coupled to the at least one camera, the object identifier identifying an object which is in the field of view of the at least one camera;

a display electrically coupled to the at least one camera and the object identifier which displays an image generated by said at least one camera and provides an indication of the type of object identified by the object identifier which is in the field of view of the at least one camera.

2. The blind spot vison system according to claim 1 further comprising a relative speed identifier which determines a relative speed of the object which is in the field of view the at least one camera and which is identified by the object identifier.

3. The blind spot vision system according to claim 1 wherein the identification of the object which is in the field of view of the at least one camera is displayed on the display.

4. The blind spot vision system according to claim 3 wherein the object identifier determines the type of vehicle which is in the field of view of the at least one camera.

5. The blind spot vision system according to claim 4 wherein the type of vehicle is one of a car, truck, light-truck, van, motorcycle, sport utility vehicle, and bus.

6. The blind spot vision system according to claim 5 wherein the type of vehicle is displayed on the display.

7. The blind spot vision system according to claim 4 wherein the type of vehicle is displayed on the display.

8. The blind spot vision system according to claim 1 wherein the relative speed identifier comprises at least first and second speed determining cameras which provide position information at specific instants in time with respect to the object in the field of view of the at least one camera.

9. The blind spot vision system according to claim 1 further comprising an image processor coupled to the at least one camera for receiving a signal generated by the at least one camera which corresponds to the field of view of the camera, the image processor generating a signal which is provided to the display for displaying the field of view of the at least one camera on the display.

10. A blind spot vision system for a vehicle, comprising:

at least one camera having a field of view, the at least one camera being positioned on the vehicle such that the field of view corresponds with at least a portion of an area proximate the vehicle which is non-visible to a driver while the driver look in mirrors that are positioned on the vehicle;

a relative speed identifier which determines a relative speed of an object which is in the field of view of the at least one camera; and a display electrically coupled to the at least one camera and the relative speed identifier which displays an image generated by said at least one camera and provides an indication of the relative speed of the object which is in the field of view of the at least one camera.

11. The blind spot vision system for a vehicle according to claim 10 wherein the relative speed of the object which is in the field of view of the at least one camera is displayed on the display.

12. The blind spot vision system according to claim 10 wherein the relative speed identifier comprises at least first and second speed determining cameras which provide position information with respect to the object in the field of view of the at least one camera.

13. The blind spot vision system according to claim 10 wherein the relative speed identifier comprises one of a radar type system, sonar type system, stereo cameras or a single camera system.

14. The blind spot vision system according to claim 10 further comprising an image processor coupled to at least the blind spot camera for receiving a signal generated by the at least one camera which corresponds to the field of view of the camera, the image processor generating a signal which is provided to the display for displaying the field of view of the at least one camera on the display.

* * * * *